United States Patent
Ranta

(10) Patent No.: US 6,751,485 B2
(45) Date of Patent: Jun. 15, 2004

(54) SOUNDING ALERT FOR RECENT CALLS

(75) Inventor: Jukka Ranta, Turku (FI)

(73) Assignee: Nokia Corporation, Espoo (FI)

( * ) Notice: Subject to any disclaimer, the term of this patent is extended or adjusted under 35 U.S.C. 154(b) by 147 days.

(21) Appl. No.: 09/894,737

(22) Filed: Jun. 28, 2001

(65) Prior Publication Data

US 2003/0003966 A1 Jan. 2, 2003

(51) Int. Cl.7 ............................................... H04M 1/00
(52) U.S. Cl. .................... 455/567; 455/414.1; 379/911
(58) Field of Search ............................. 455/414.1, 415, 455/418, 550.1, 567, 575.1; 379/67.1, 88.11, 88.12, 88.19, 88.2, 88.21, 911, 252, 142.01, 142.09

(56) References Cited

U.S. PATENT DOCUMENTS

| 5,329,578 | A | | 7/1994 | Brennan et al. |
| 5,479,476 | A | | 12/1995 | Finke-Anlauff |
| 5,724,411 | A | | 3/1998 | Eisdorfer et al. |
| 5,768,349 | A | * | 6/1998 | Knuth et al. |
| 5,978,451 | A | * | 11/1999 | Swan et al. |
| 6,289,084 | B1 | * | 9/2001 | Bushnell ............ 379/67.1 |
| 2001/0041600 | A1 | * | 11/2001 | Backer et al. |
| 2002/0009184 | A1 | * | 1/2002 | Shnier |

FOREIGN PATENT DOCUMENTS

| EP | 0611070 | 8/1994 |
| EP | 0901263 | 3/1999 |

OTHER PUBLICATIONS

U.S. Patent Publication No. US 2001/0041600 A1/ Publication Date: Nov. 15, 2001.

* cited by examiner

Primary Examiner—Erika Gary
Assistant Examiner—Huy D Nguyen

(57) ABSTRACT

Phone numbers of recently made, received or missed phone calls are stored (16) in a memory of a mobile telephone and associated with a distinctive alerting sound. An incoming call matching (34) one of the stored phone numbers causes the distinctive alerting sound to be sounded unless the phone number matches (26) a number prestored by the user and associated with an individual or organization known to the user.

8 Claims, 3 Drawing Sheets

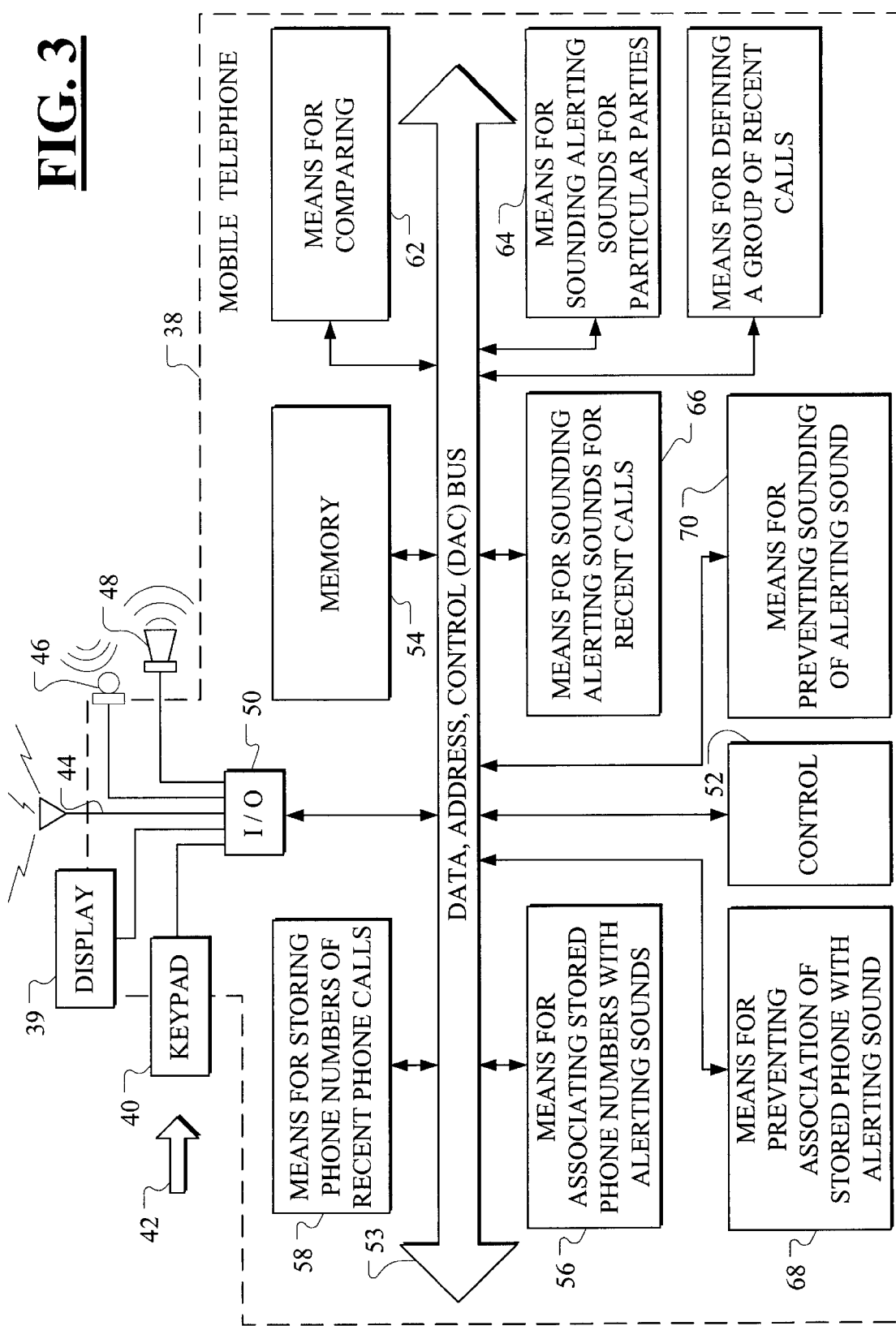

SOUNDING ALERT FOR RECENT CALLS

BACKGROUND OF THE INVENTION

1. Technical Field

The present invention relates to mobile telephones and, more particularly, grouping phone numbers of certain calls in order to facilitate the annunciation of distinctive alerting sounds associated with each group of phone numbers or individual phone numbers.

2. Background Art

Alerting tones are nowadays one of the most popular features of the mobile phone. Different alerting tones are associated with different individuals or parties and are advantageous because the user has an idea of the caller already before seeing the display of the phone. The user can prepare in a suitable way to answering the phone immediately when it starts ringing. The knowledge of the source of the call has become of the utmost importance to these customers.

Furthermore, it is now commonplace for mobile telephones to provide user-adjustable operating characteristics such as the volume of an output signal, the ringing volume, and the generation of tone sequences upon receiving a call from a particular telephone number or from a telephone number stored in such a way that it is grouped with other telephone numbers in a category defined by the user or the vendor of the mobile telephone. For instance, U.S. Pat. No. 5,479,476 shows a mobile telephone having the capability to define a plurality of groups, each of which includes a plurality of user-adjustable characteristics. Values for individual characteristics may be input and one of the defined groups selected for use in controlling an operation of the mobile telephone, at least partially in accordance with the inputted values of the selected one of the groups. For instance, the characteristics might include sound volume, ringing tone, key tones, warning tones, lights, call transfer, etc. The different groups may constitute "ambient conditions", such as indoors, outdoors, conference/theater, car, personal, etc. Each group has the individual characteristics set appropriately for the given ambient condition. For instance, the ringing tone may be made silent upon selecting the conference/theater group, and the key tones may be set "off" as well.

There is a category or group of phone calls which is the recently-received phone calls which a user would not normally be inclined to include in any such groupings for future reference, because calls to or from these numbers are of a temporary nature and are not likely to be frequently called in the long-term.

It would be nonetheless desirable for the user to be able to distinguish calls from totally unknown sources from calls that have been used recently, but have not been grouped for alerting with distinctive characteristics.

DISCLOSURE OF INVENTION

An object of the present invention is to alert the mobile device user that an incoming call is from a group comprising recently made, received or missed calls.

According to a first aspect of the invention, a method for use in a mobile telephone having means for storing phone numbers of recently made or received phone calls, wherein said mobile telephone stores said phone numbers of recently made or received phone calls in a memory having capacity dedicated for only a limited number of phone numbers of said recently made or received phone calls which are removed one or more at a time according to a selected capacity management methodology, said method comprises the steps of associating said stored phone numbers of recently made or received phone calls with a distinctive alerting sound generally indicative of recently made or received phone calls, and sounding said distinctive alerting sound upon receiving a call from one of said phone numbers of recently made or received calls.

Further according to the first aspect of the invention, the method further comprises the step of preventing said step of associating or sounding in a case where said call received from one of said phone numbers of recently made or received calls matches a phone number prestored in said memory by a user.

Still further according to the first aspect of the invention, the method further comprises the step of sounding a distinctive alerting sound indicative of a particular party associated with said phone number prestored in said memory by said user.

Further still according to the first aspect of the invention, the distinctive alerting sound is instead indicative of a particular party having an associated phone number selected and prestored in said memory by a user of said mobile telephone.

In further accord with the first aspect of the invention, the distinctive alerting sound is separately generally indicative of recently made, received or missed calls with recently made calls, recently received calls, and recently missed calls having alerting sounds distinct from each other.

According to a second aspect of the invention, a method for use in a mobile telephone that stores phone numbers of recently made or received phone calls in a memory having capacity dedicated for only a limited number of phone numbers which are removed one or more at a time according to a selected capacity management process, said method comprises the steps of comparing a phone number of an incoming phone call to said recently made or received phone numbers stored in said memory and upon finding a match, sounding a distinctive alerting sound.

Further according to the second aspect of the invention, the mobile telephone also stores phone numbers entered by a user, wherein said method further comprises the step of comparing said phone number of said incoming phone call to said stored phone numbers entered by said user and only sounding said distinctive alerting sound in the absence of a match.

Still further according to the second aspect of the invention, the distinctive alerting sound for recently made calls is distinct from recently received calls.

According to a third aspect of the invention, a method for use in a mobile telephone having means for storing phone numbers of recently made, received, or missed calls, wherein said mobile telephone stores said phone numbers of recently made, received, or missed calls in a memory having capacity dedicated for only a limited number of phone numbers of said recently made, received, or missed calls that are removed one or more at a time according to a memory management technique, said method comprises the steps of comparing a phone number of an incoming phone call to said phone numbers of recently made, received, or missed calls stored in said memory and also to phone numbers stored by a user, and sounding a distinctive alerting sound generally indicative of recently made, received or missed calls upon said step of comparing yielding a match between said phone number of said incoming phone call and a phone number of a recently made, received, or missed call stored in said memory except upon said step of comparing also yielding a match between said phone number of said incoming phone call and a phone number stored by the user, in which case said distinctive alerting sound is indicative of a particular party having said phone number stored by the user.

Further according to the third aspect of the invention, the distinctive alerting sound is separately generally indicative of recently made, received or missed calls with recently made calls, recently received calls, and recently missed calls having alerting sounds distinct from each other.

According to a fourth aspect of the invention, a method for use in a mobile telephone having phone numbers stored by a user in groups in a memory with separate sequences of alerting tones associated by the user with each group, comprises the steps of defining a new group for storing a selected number of phone numbers of most recently made or received phone calls in a portion of said memory or in a separate memory having a storage capacity limited by a memory management process to storing a maximum of said selected number of phone numbers, and alerting the user to a received phone call from a phone number presently stored in said portion of said memory or in said separate memory with a distinctive sequence of alerting tones associated with said new group.

Further according to the fourth aspect of the invention, the step of alerting the user to a received phone call is made with a distinctive sequence of alerting tones associated with a group associated with a phone number already stored in said mobile telephone by said user and associated with said group rather than said new group.

Further still according to the fourth aspect of the invention, the new group also includes phone numbers of most recently missed phone calls.

According to a fifth aspect of the invention, a mobile telephone having means for storing phone numbers of recently made or received phone calls, wherein said mobile telephone stores said phone numbers of recently made or received phone calls in a memory having capacity dedicated for only a limited number of phone numbers of said recently made or received phone calls which are removed one or more at a time according to a selected capacity management methodology, said mobile telephone further comprises means for associating said stored phone numbers of recently made or received phone calls with a distinctive alerting sound generally indicative of recently made or received phone calls, and means for sounding said distinctive alerting sound upon receiving a call from one of said phone numbers of recently made or received calls.

Further according to the fifth aspect of the invention, a mobile telephone further comprises means for preventing said step of associating or sounding in a case where said call received from one of said phone numbers of recently made or received calls matches a phone number prestored in said memory by a user.

Further still according to the fifth aspect of the invention, the mobile telephone further comprises means for sounding a distinctive alerting sound indicative of a particular party associated with said phone number prestored in said memory by said user.

Still further according to the fifth aspect of the invention, the distinctive alerting sound is instead indicative of a particular party having an associated phone number selected and prestored in said memory by a user of said mobile telephone.

Further still according to the fifth aspect of the invention, the distinctive alerting sound is separately generally indicative of recently made, received or missed calls with recently made calls, recently received calls, and recently missed calls having alerting sounds distinct from each other.

According to a sixth aspect of the invention, a mobile telephone that stores phone numbers of recently made or received phone calls in a memory having capacity dedicated for only a limited number of phone numbers which are removed one or more at a time according to a selected capacity management process further comprises means for comparing a phone number of an incoming phone call to said recently made or received phone numbers stored in said memory, and means for sounding a distinctive alerting sound upon finding a match.

Further according to the sixth aspect of the invention, the mobile telephone also stores phone numbers entered by a user, wherein said method further comprises means for comparing said phone number of said incoming phone call to said stored phone numbers entered by said user and only sounding said distinctive alerting sound in the absence of a match.

Further still according to the sixth aspect of the invention, the distinctive alerting sound for recently made calls is distinct from that for recently received calls.

According to a seventh aspect of the invention, a mobile telephone having means for storing phone numbers of recently made, received, or missed calls, wherein said mobile telephone stores said phone numbers of recently made, received, or missed calls in a memory having capacity dedicated for only a limited number of phone numbers of said recently made, received, or missed calls that are removed one or more at a time according to a memory management technique, said mobile telephone comprises means for comparing a phone number of an incoming phone call to said phone numbers of recently made, received, or missed calls stored in said memory and also to phone numbers stored by a user, and means for sounding a distinctive alerting sound generally indicative of recently made, received or missed calls upon said means for comparing yielding a match between said phone number of said incoming phone call and a phone number of a recently made, received, or missed call stored in said memory except upon said means for comparing also yielding a match between said phone number of said incoming phone call and a phone number stored by the user, in which case said distinctive alerting sound is indicative of a particular party having said phone number stored by the user.

Further according to the seventh aspect of the invention, the distinctive alerting sound is separately generally indicative of recently made, received or missed calls with recently made calls, recently received calls, and recently missed calls having alerting sounds distinct from each other.

According to an eighth aspect of the invention, a mobile telephone having phone numbers stored by a user in groups in a memory with separate sequences of alerting tones associated by the user with each group, comprises means for defining a new group for storing a selected number of phone numbers of most recently made or received phone calls in a portion of said memory or in a separate memory having a storage capacity limited by a memory management process to storing a maximum of said selected number of phone numbers, and means for alerting the user to a received phone call from a phone number presently stored in said portion of said memory or in said separate memory with a distinctive sequence of alerting tones associated with said new group.

Further according to the eighth aspect of the invention, the means for alerting the user to a received phone call provides a distinctive sequence of alerting tones associated with a group associated with a phone number already stored in said mobile telephone by said user and associated with said group rather than said new group.

Further still according to the eighth aspect of the invention, the new group also includes phone numbers of most recently missed phone calls.

This invention further enhances the versatility of the alerting tones and their association to the telephone numbers. The user can define separate alerting tones for the telephone numbers of recently called, received, or missed calls which are not stored in the permanent short code memory (SCM) of the phone. With this feature the user can distinguish the calls coming from totally unknown sources from the ones that have been used recently, but are of a temporary nature. These would typically be the numbers of offices, shops, hospitals, etc., where the user could make or from which the user would receive a few calls during a few days or a couple of weeks, but does not want to store them to the short code memory and define user groups and specific alerting tones for them, because the user does not expect to call them over the long-term future. Still, it would be helpful if calls coming from these recently frequently-used numbers could be distinguished from the other calls by a distinctive alerting sound.

These and other objects, features and advantages of the present invention will become more apparent in light of the detailed description of a best mode embodiment thereof, as illustrated in the accompanying drawing.

BRIEF DESCRIPTION OF THE DRAWINGS

FIG. 3 shows a mobile device capable of carrying out the steps shown in FIGS. 1 and 2, according to the present invention.

BEST MODE FOR CARRYING OUT THE INVENTION

Figure 1:
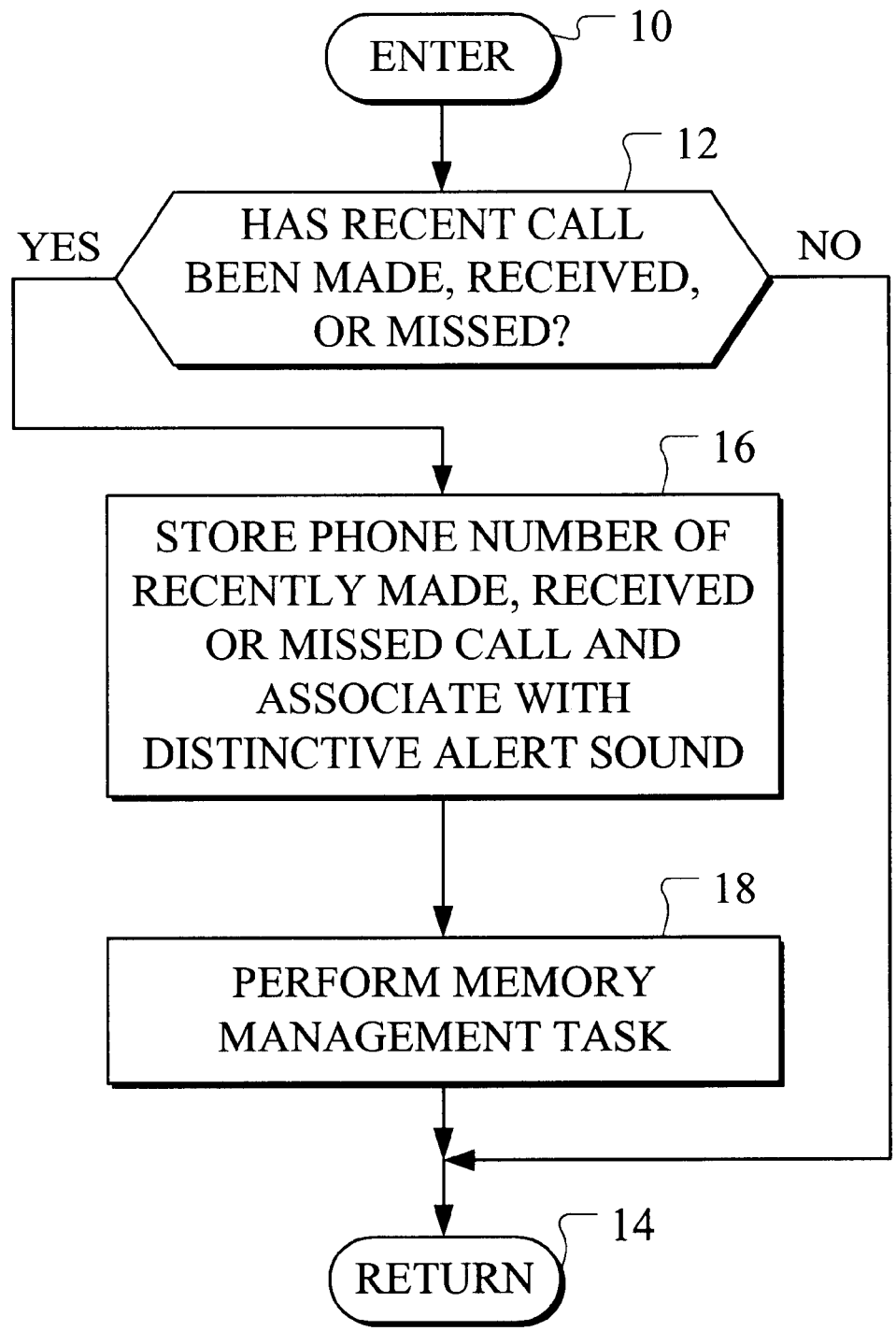
FIG. 1 shows a series of steps which may be carried out in a mobile device for storing a phone number of a recently made, received or missed call among others and associating same with a distinctive alerting sound, according to the present invention, and including performance of a memory management task designed to limit the number of such calls stored in the mobile device.

FIG. 1 shows a series of steps which may be carried out in a mobile device such as a mobile telephone for storing a phone number of a recently made, received or missed call and associating the stored number with a distinctive alerting sound. After entering in a step 10, a decision step 12 is executed to determine if a call has recently been made, received or missed. For instance, if a call has been made, received or missed since the last execution of the routine shown in FIG. 1, then it will be considered to be recent. If not, a return is made in a step 14. However, if a recent call has been made, received or missed, a step 16 is executed in order to retrieve and specially store the phone number of the recently made, received or missed call in a memory or portion of memory set aside especially for that purpose. This memory or portion of memory is managed according to a selected capacity management methodology such that it has a capacity dedicated for only a limited number of phone numbers of such recently made, received or missed phone calls. This methodology could be a method of sizing the memory to some limited size or could be a methodology such as a first-in-first-out (FIFO) methodology, or other equivalent technique. The stored phone numbers of the recently made or received phone calls are removed one or more at a time according to the selected capacity management methodology. This is indicated generally at a step 18 of FIG. 1 indicated as a step of performing a memory management task. Referring back to the step 16, in addition to storing the phone number of the recently made, received or missed call, an association is made between the stored phone numbers of recently made, received or missed phone calls with a distinctive alerting sound generally indicative of recently made, received or missed phone calls.

Once a phone number is removed by the memory management methodology, the association may be cancelled. At any given time, a limited number of phone numbers of recently made, received or missed phone calls are stored in the memory and associated with the distinctive alerting sound.

As part of the storage process of step 16, the step of associating can be prevented or omitted in a case where the call received from one of the phone numbers of recently made or received calls is found to match a phone number already stored in the memory by a user. Such might be for instance the phone number of an individual or organization known by the user and already positively associated by the user with a distinctive alerting sound for that user or organization. In that case, the storage and association of step 16 of FIG. 1 also includes a comparison step which allows the comparison of the phone number of the recently made, received or missed phone call with such phone numbers already prestored by the user.

It should be realized that the step of associating 16 can be an association of a distinctive alerting sound for one or more or for each of the different categories of recently made, received or missed calls, i.e., each having alerting sounds distinct from each other.

Figure 2:
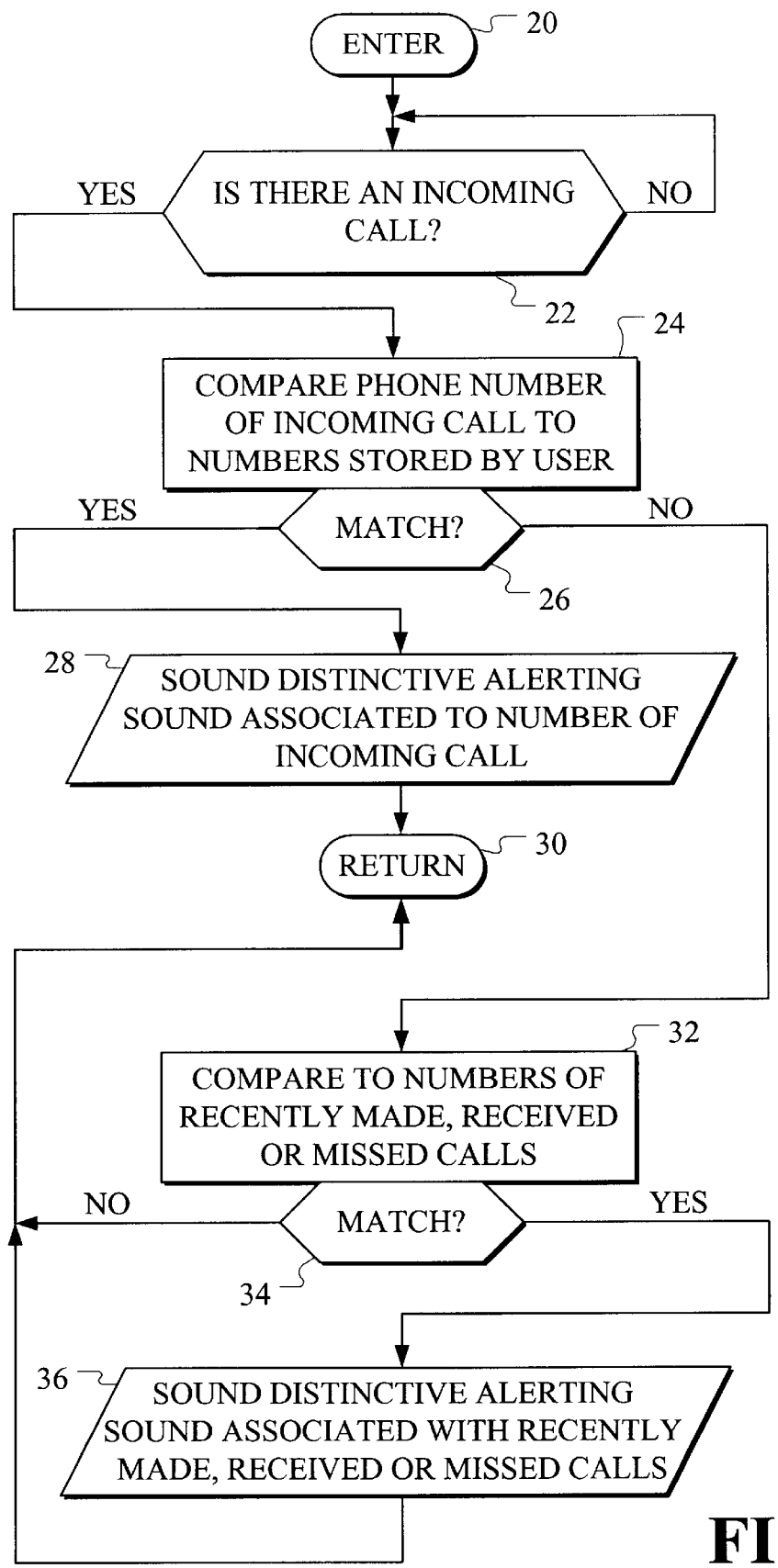
FIG. 2 shows a series of steps, according to the present invention, for sounding a distinctive alerting sound for an incoming call found to be associated to either a known party or a recently made, received or missed call.

Referring now to FIG. 2, a series of steps is shown for sounding a distinctive alerting sound for an incoming call that is found to be associated with either a known party or with a recently made, received or missed call that is temporarily stored in the memory set aside for these calls. After entering in a step 20, a decision step 22 is executed to determine if there is an incoming call or not. If not, it is repeated endlessly until an incoming call is detected. It should be realized that a return could be made instead of repeating step 22 endlessly and thereafter entering at step 20 again at a selected time. In any event, assuming there is an incoming call detected, a step 24 is next executed to compare the phone number of the incoming call to numbers already stored by a user and already associated with distinctive alerting sounds for particular persons or organizations known to the user. If a match is found as determined in a step 26, a distinctive alerting sound associated to the telephone number of the incoming call is sounded as indicated in a step 28, followed by a return in a step 30.

If no match were found in the step 26, a step 32 is executed instead of step 28 in order to compare the number of the incoming phone call to numbers of recently made, received or missed calls as previously stored in the step 16 of FIG. 1. If no match is found in a step 34, then the return step 30 is executed. On the other hand, if a match is found by the step 34, then a step 36 is executed to sound a distinctive alerting sound associated with recently made, received or missed calls after which a return is made in the step 30 and the user can thereby be alerted that the incoming call is from this category of recent calls. As mentioned previously, the alerting sound can be generically associated with all three of recently made, received or missed calls, i.e., generically "recent" calls or there can be provided separate distinctive alerting sounds for each type of recently made, received or missed calls. This is controlled in the step of associating in step 16 of FIG. 1 as previously discussed. It should be mentioned that the step 16 of FIG. 1 can be viewed as a step of defining a new group for storing a selected number of phone numbers of most recently made or received phone calls in a portion of the memory or in a separate memory having a storage capacity limited by the memory management process described in connection with step 18 so as to store the selected number of phone numbers only.

Referring now to FIG. 3, a mobile device such as a mobile telephone 38 is shown capable of carrying out the step shown in FIGS. 1 and 2 according to the present invention. Such a mobile telephone includes a display 39, a keypad 40 for receiving keypad depressions 42 from a user as well as an antenna 44, a microphone 46 and a speaker 48. These are all shown connected to an input/output (I/O) device 50 which communicates with a control 52 over a data, address and control (DAC) bus 53 that interconnects various other functional blocks shown in the figure for carrying out the present invention. It would be realized that although separate functional blocks are shown, typically these functions would be embodied in a special purpose chip or software and coded for execution in such a way as to carry out the steps of FIGS. 1 and 2 using a general purpose computer, a special purpose computer, microcontroller or the like.

A memory 54 is shown in FIG. 3 for storing phone numbers of recently made, received or missed phone calls. The memory has a capacity dedicated for only a limited number of such phone numbers. These are removed one or more at a time according to a selected capacity management methodology. Also included in the mobile telephone 38 is a means 56 for associating the stored phone numbers of recently made, received or missed phone calls with a distinctive alerting sound generally indicative of such phone calls. The means 56 corresponds to the step 16 of associating shown in FIG. 1. Also associated with the step 16 of FIG. 1 is a means 58 for storing phone numbers of recently made, received or missed phone calls. The memory management task 18 of FIG. 1 can be performed by the control means 52 according for instance to a FIFO technique applied to the memory 54.

A means for comparing 62 is provided for carrying out the step 24 of FIG. 2 and/or the step 32. The means 62 also carries out the decision steps 26, 34. If the first comparison step 24 of FIG. 2 is found by the means 62 to be a match, the distinctive alerting sound indicated by the step 28 is sounded by a means 64 for sounding alerting sounds associated with particular individuals or parties that have been prestored and associated by the user. On the other hand, if the steps 32, 34 result in a match, the step 36 is executed by means for sounding a distinctive alerting sound associated with recently made, received or missed calls whether it be a generic sound or individual sounds associated with each type of recent call.

As mentioned previously, the step 16 of FIG. 1 can include a step such as the steps 24, 26 of FIG. 2 so as to prevent the association of the phone number of the incoming call with the distinctive alerting sound reserved for recently made, received or missed calls. Such a functional block 68 is shown in FIG. 3. Or, a means 70 can be provided for simply preventing the sounding of the alerting sound in case of a match with a number prestored by the user and allowing the sounding of an alerting sound associated with a person or organization known to the user.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method, for use in a mobile telephone having means for storing phone numbers of recently made or received phone calls, wherein said mobile telephone stores said phone numbers of recently made or received phone calls in a memory having capacity dedicated for only a limited number of phone numbers of said recently made or received phone calls which are removed one or more at a time according to a selected capacity management methodology, said method comprising the steps of:

associating said stored phone numbers of recently made or received phone calls with a distinctive alerting sound generally indicative of recently made or received phone calls, and sounding said distinctive alerting sound upon receiving a call from one of said phone numbers of recently made or received calls, wherein said distinctive alerting sound is separately generally indicative of recently made, received or missed calls with recently made calls, recently received calls, and recently missed calls having alerting sounds distinct from each other.

2. Method, for use in a mobile telephone that stores phone numbers of recently made or received phone calls in a memory having capacity dedicated for only a limited number of phone numbers which are removed one or more at a time according to a selected capacity management process, said method comprising the steps of:

comparing a phone number of an incoming phone call to said recently made or received phone numbers stored in said memory and upon finding a match, sounding a distinctive alerting sound, wherein said distinctive alerting sound for recently made calls is distinct from that for recently received calls.

3. Method for use in a mobile telephone having means for storing phone numbers of recently made, received, or missed calls, wherein said mobile telephone stores said phone numbers of recently made, received, or missed calls in a memory having capacity dedicated for only a limited number of phone numbers of said recently made, received, or missed calls that are removed one or more at a time according to a memory management technique, said method comprising the steps of:

comparing a phone number of an incoming phone call to said phone numbers of recently made, received, or missed calls stored in said memory and also to phone numbers stored by a user, and sounding a distinctive alerting sound generally indicative of recently made, received, or missed calls upon said step of comparing yielding a match between said phone number of said incoming phone call and a phone number of a recently made, received, or missed call stored in said memory except upon said step of comparing also yielding a match between said phone number of said incoming phone call and a phone number stored by the user, in which case said distinctive alerting sound is indicative of a particular party having said phone number stored by the user, wherein said distinctive alerting sound is separately generally indicative of recently made, received or missed calls with recently made calls, recently received calls, and recently missed calls having alerting sounds distinct from each other.

4. Method, for use in a mobile telephone having phone numbers stored by a user in groups in a memory with separate sequences of alerting tones associated by the user with each group, comprising the steps of:

defining a new group for storing a selected number of phone numbers of most recently made or received phone calls in a portion of said memory or in a separate memory having a storage capacity limited by a memory management process to storing a maximum of said selected number of phone numbers, and alerting the user to a received phone call from a phone number presently stored in said portion of said memory or in said separate memory with a distinctive sequence of alerting tones associated with said new group wherein said new group also includes phone numbers of most recently missed phone calls.

5. Mobile telephone having means for storing phone numbers of recently made or received phone calls, wherein said mobile telephone stores said phone numbers of recently made or received phone calls in a memory having capacity dedicated for only a limited number of phone numbers of said recently made or received phone calls which are removed one or more at a time according to a selected capacity management methodology, said mobile telephone further comprising:

means for associating said stored phone numbers of recently made or received phone calls with a distinctive alerting sound generally indicative of recently made or received phone calls; and means for sounding said distinctive alerting sound upon receiving a call from one of said phone numbers of recently made or received calls, wherein said distinctive alerting sound is separately generally indicative of recently made, received or missed calls with recently made calls, recently received calls, and recently missed calls having alerting sounds distinct from each other.

6. Mobile telephone that stores phone numbers of recently made or received phone calls in a memory having capacity dedicated for only a limited number of phone numbers which are removed one or more at a time according to a selected capacity management process, said mobile telephone further comprising:

means for comparing a phone number of an incoming phone call to said recently made or received phone numbers stored in said memory; and means for sounding a distinctive alerting sound upon finding a match, wherein said distinctive alerting sound for recently made calls is distinct from that for recently received calls.

7. Mobile telephone having means for storing phone numbers of recently made, received, or missed calls, wherein said mobile telephone stores said phone numbers of recently made, received, or missed calls in a memory having capacity dedicated for only a limited number of phone numbers of said recently made, received, or missed calls that are removed one or more at a time according to a memory management technique, said mobile telephone comprising:

means for comparing a phone number of an incoming phone call to said phone numbers of recently made, received, or missed calls stored in said memory and also to phone numbers stored by a user; and means for sounding a distinctive alerting sound generally indicative of recently made, received or missed calls upon said means for comparing yielding a match between said phone number of said incoming phone call and a phone number of a recently made, received, or missed call stored in said memory except upon said means for comparing also yielding a match between said phone number of said incoming phone call and a phone number stored by the user, in which case said distinctive alerting sound is indicative of a particular party having said phone number stored by the user, wherein said distinctive alerting sound is separately generally indicative of recently made, received or missed calls with recently made calls, recently received calls, and recently missed calls having alerting sounds distinct from each other.

8. Mobile telephone having phone numbers stored by a user in groups in a memory with separate sequences of alerting tones associated by the user with each group, comprising:

means for defining a new group for storing a selected number of phone numbers of most recently made or received phone calls in a portion of said memory or in a separate memory having a storage capacity limited by a memory management process to storing a maximum of said selected number of phone numbers; and means for alerting the user to a received phone call from a phone number presently stored in said portion of said memory or in said separate memory with a distinctive sequence of alerting tones associated with said new group, wherein said new group also includes phone numbers of most recently missed phone calls.

\* \* \* \* \*